(12) United States Patent
Johnson

(10) Patent No.: US 7,239,113 B2
(45) Date of Patent: Jul. 3, 2007

(54) METHOD FOR REDUCING UNDESIRED CURRENTS IN AN ELECTRICAL POWER GENERATION SYSTEM

(75) Inventor: James P. Johnson, Boerne, TX (US)

(73) Assignee: Caterpillar Inc, Peoria, IL (US)

( * ) Notice: Subject to any disclaimer, the term of this patent is extended or adjusted under 35 U.S.C. 154(b) by 109 days.

(21) Appl. No.: 11/121,245

(22) Filed: May 3, 2005

(65) Prior Publication Data

US 2006/0250115 A1  Nov. 9, 2006

(51) Int. Cl.
    *H02J 7/14* (2006.01)
(52) U.S. Cl. ............................ 322/58; 322/57; 322/59; 322/28; 322/99; 322/20; 322/37; 322/19; 290/40 C
(58) Field of Classification Search .................. 322/58, 322/57, 59, 28, 99, 20, 36, 37, 19; 290/40 C
    See application file for complete search history.

(56) References Cited

U.S. PATENT DOCUMENTS

| 4,321,526 A | | 3/1982 | Weischedel |
| 4,471,288 A | * | 9/1984 | Morishita et al. .............. 322/99 |
| 4,542,462 A | * | 9/1985 | Morishita et al. .............. 701/1 |
| 4,583,036 A | * | 4/1986 | Morishita et al. ........... 320/136 |
| 4,651,081 A | * | 3/1987 | Nishimura et al. .......... 320/123 |
| 4,739,245 A | * | 4/1988 | Komurasaki et al. .......... 322/99 |
| 4,843,534 A | | 6/1989 | Taddeo et al. |
| 5,216,350 A | * | 6/1993 | Judge et al. .................... 322/25 |
| 5,440,222 A | * | 8/1995 | Tanaka et al. ................. 322/25 |
| 5,512,812 A | * | 4/1996 | Ono ............................. 322/28 |
| 5,663,876 A | | 9/1997 | Newton et al. |
| 5,698,968 A | * | 12/1997 | Takagi et al. ................. 322/58 |
| 5,760,486 A | * | 6/1998 | Uchinami et al. ......... 290/40 C |
| 5,764,037 A | | 6/1998 | Jacobs et al. |
| 5,929,613 A | * | 7/1999 | Tsuchiya et al. .............. 322/58 |
| 5,977,731 A | * | 11/1999 | Xia et al. ..................... 318/147 |
| 6,130,523 A | * | 10/2000 | Hughes et al. ................. 322/45 |
| 6,154,090 A | | 11/2000 | Wissmach et al. |
| 6,369,461 B1 | | 4/2002 | Jungreis et al. |

\* cited by examiner

*Primary Examiner*—Darren Schuberg
*Assistant Examiner*—Iraj A. Mohandsi
(74) *Attorney, Agent, or Firm*—Liell + McNeil (57) ABSTRACT

An electrical power generation system is provided, and a method of reducing undesired currents therein. The method includes the steps of delivering current via at least one variable frequency switching means, and adjusting a switching frequency of the at least one variable frequency switching means based on the power output of the system. The system may further include an electronic controller having a control algorithm recorded thereon, the control algorithm including means for adjusting the variable frequency switching means based on a power output of the system.

26 Claims, 2 Drawing Sheets

METHOD FOR REDUCING UNDESIRED CURRENTS IN AN ELECTRICAL POWER GENERATION SYSTEM

STATEMENT OF GOVERNMENT INTEREST

The United States Government has certain rights in the present patent application, and any patent that may issue thereon, under DOE contract DE-FC36-01G011095.

TECHNICAL FIELD

The present disclosure relates generally to electrical power generation apparatuses and methods, and relates more particularly to a method of reducing undesired currents in an electrical power generation system.

BACKGROUND

Electrical power generation is indispensable to modern society, and ranges in scale from enormous, coal-fired, nuclear and hydro-electric power plants to small electrical generators running on hydrocarbon fuels. In recent years, the prevalence of electrical energy production technologies having a perception of cleaner or more efficient operation has increased. Fuel cells in particular have received increasing attention in both technical and commercial circles.

In one common type of fuel cell power generation system, a fuel cell is provided which outputs electrical current to an electrical grid or an electrical power-driven device, often referred to as the utility. In many circumstances, the output voltage of the fuel cell will be relatively lower than the desired voltage that will ultimately be supplied to the utility. Similarly, because AC power is more widely used than DC power, in many instances it will be necessary to invert a DC output power from the fuel cell to a suitable AC power, for example, 3-phase AC electrical power.

An electronic system commonly known in the art as a "power converter" will typically be disposed between the fuel cell and the utility, which appropriately conditions a DC output from the fuel cell prior to its delivery to the utility. Many power converter designs are known in the art. In one common design a first stage, known as a "boost converter" is primarily responsible for boosting the fuel cell output to a higher voltage, called the DC link voltage. An "inverter" may be coupled with the boost converter via a DC link, and inverts the DC power from the boost converter to AC power.

Any electrical power generation system will have certain operating requirements and challenges that must be addressed for successful operation. For instance, many power sources are sensitive to certain electrical disturbances from components downstream thereof. Ripple currents are one such disturbance and are a well-known problem. If left unchecked or uncontrolled, ripple currents can actually cause or speed degradation of internal components of a fuel cell. Many fuel cell manufacturers recommend particular ripple current limits, or total current to ripple current ratios, for optimal operation and durability. In the past, power generation system designers have typically implemented input filters to reduce ripple currents between the fuel cell and the power converter. Such filters may include reactive components, such as inductors, that tend to be relatively large, heavy and expensive. The size of the inductors used in the input filter is generally inversely proportional to the input power levels expected to be encountered during operation. In other words, where low power levels are expected during operation, as is usually the case at least some of the time, relatively large and expensive input filters must be used if ripple current requirements are to be met.

Other operational requirements are concerned with the actual power transferred between the electrical power generation system and the utility. One example of such requirements are the limits which may be imposed by regulatory agencies on individual harmonic currents and total harmonic distortion produced when an inverter interacts with the utility, absorbing or supplying power. In this instance, harmonic currents may be generally defined as undesired currents having a frequency different from the frequency of the fundamental or desired output current. In many instances, the harmonic currents can generate radio frequency distortion that can interfere with various electronic devices. Engineers have addressed output current harmonics in a manner similar to the approach applied to input ripple currents, namely, with an output filter, however, the output filters tend to have shortcomings similar to the input filters discussed above.

U.S. Pat. No. 6,369,461 to Jungreis et al. discloses one electrical power generation system that includes a fuel cell, an inverter and a boost converter. Jungreis et al. utilize a battery coupled with a DC bus via a diode to support large positive load steps that cannot initially be compensated for with a fuel cell. The boost converter is said to be sized for common load changes rather than maximum possible load changes. While the boost converter may be relatively smaller than in certain other designs, the use of the battery and diode introduce substantial complexity into the system.

The present disclosure is directed to one or more of the problems or shortcomings set forth above.

SUMMARY OF THE DISCLOSURE

In one aspect, a method of reducing undesired currents from an electrical power generation system is provided. The method includes the step of delivering current via a variable frequency switching means of the electrical power generation system. The method further includes the step of, adjusting a switching frequency of the switching means, based at least in part on a power output of the electrical power generation system.

In another aspect, the present disclosure provides an electrical power generation system. The system includes, at least one variable frequency switching means, and an electronic controller in control communication with the at least one variable frequency switching means. The electronic controller includes a switching algorithm having means for adjusting a switching frequency of the at least one variable frequency switching means, based at least in part on a power output of the electrical power generation system.

In still another aspect, the present disclosure provides an electronic controller for an electrical power generation system that includes a source of electrical power and at least one variable frequency switching means coupled therewith. The electronic controller includes, a microprocessor having a computer readable medium with a switching algorithm recorded thereon. The switching algorithm includes means for reducing at least one undesired current oscillation in the electrical power generation system. The means for reducing includes means for adjusting a switching frequency of the switching means based at least in part on a variable indicative of a power output of the electrical power generation system.

DETAILED DESCRIPTION

Figure 1:
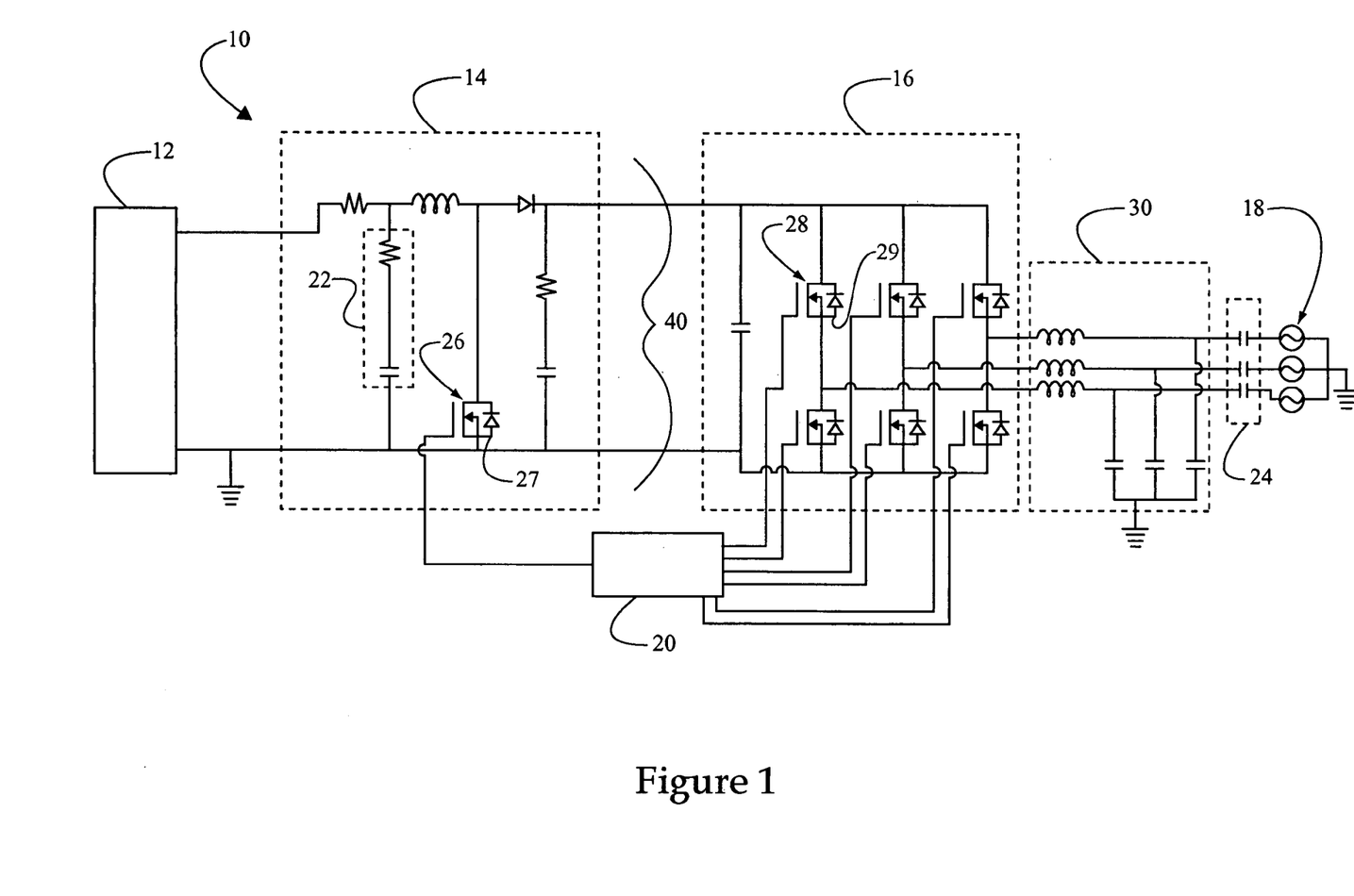
FIG. 1 is a diagrammatic illustration of an electrical power generation system according to the present disclosure.

Referring to FIG. 1, there is shown an electrical power generation system 10. System 10 includes an electrical power source 12, for instance a DC power source, which may be coupled with at least one of a boost converter 14 and an inverter 16. Together, boost converter 14 and inverter 16 comprise a power converter, coupled between electrical power source 12 and a utility 18. It is contemplated that a fuel cell may be used as electrical power source 12, however, it should be appreciated that other suitable electrical power sources such as photovoltaic power sources, generators, etc. might be employed. A conventional output contactor 24 may be disposed between utility 18 and inverter 16. Boost converter 14 may be coupled with inverter 16 via a DC link 40, having a DC link voltage. An electronic controller 20 may be in control communication with boost converter 14 and with inverter 16. Although it is contemplated that in one practical embodiment, electrical power generation system 10 will include both boost converter 14 and inverter 16, alternative embodiments are contemplated. For example, electrical power generation system 10 may include only one of boost converter 14 and inverter 16, or system 10 might include both of the components, but control only one of the components according to the present disclosure.

Boost converter 14 may include a variable frequency switching means 26, or "boost converter switching means" disposed therein, which may include at least one semiconductor switch 27 operably coupled with electronic controller 20. An input filter 22 comprising reactive components such as inductors and capacitors may be coupled with boost converter 14 to filter undesired currents between fuel cell 12 and boost converter 14 in a conventional manner. Those skilled in the art will appreciate that a wide variety of suitable input filter types might be coupled with boost converter 14. The size of filter 22 may be relatively small, as described herein.

Inverter 16 also may include a variable frequency switching means 28, or "inverter switching means" disposed therein, also including at least one semiconductor switch 29, typically a plurality of switches for a 3-phase AC current embodiment. An output filter 30 comprising reactive components such as inductors and capacitors may also be coupled with inverter 16 to filter undesired currents between utility 18 and inverter 16 in a conventional manner. In a manner alike to input filter 22, the size of output filter 30 may be relatively small, as described herein.

The present disclosure further provides a method of reducing undesired currents in electrical power generation system 10. The method may include the step of delivering current via a variable frequency switching means, e.g. boost converter switching means 26 or inverter switching means 28, of electrical power generation system 10. The method may further include the step of adjusting a switching frequency of the variable frequency switching means 26, 28, based at least in part on a power output of the electrical power generation system or a determined value or variable indicative thereof. Power output of system 10 might be determined through a variety of means including, for example, a current sensor (not shown) disposed between fuel cell 12 and boost converter 14 or between inverter 16 and utility 18. Further, it should be understood that "power output" is intended to refer to both positive and negative power outputs. Where electrical power generation system 10 is coupled with a utility such as an electrical grid, system 10 may be operable to either supply or receive power. Thus, described adjustment of switching frequency may be based on changes in power supplied from system 10 to utility 18, as well as changes in power absorbed by system 10 from utility 18. Similarly, the delivering step of the present method should similarly be understood to refer to situations wherein system 10 is delivering current to utility 18, as well as situations wherein system 10 is receiving current from utility 18.

In one contemplated embodiment, the switching frequency of the variable frequency switching means 26, 28 will be increased upon determination of a decrease in power supplied from system 10 to utility 18. In particular, the switching frequency of the variable frequency switching means may be increased if, upon detection of the decrease in power output, system 10 is in a lower portion of a power output range, as described herein. The method may further include the step of, decreasing said switching frequency upon determination of an increase in power output of system 10.

Delivery of current may include both the delivery of a desired current and the delivery of undesired currents, for instance ripple currents or harmonic currents. As used herein, the term "ripple current" should be understood to refer generically to current oscillations that depart from a desired, or optimal, current. Thus, the term ripple current is used herein to broadly describe undesired current oscillations, including harmonic currents. By adjusting the switching frequency of the variable frequency switching means 26, 28, as described herein, ripple currents may be reduced. Thus, the aforementioned step of delivering current may be thought of as delivering both a desired current and one or more ripple currents.

The step of adjusting the switching frequency may further comprise maintaining a ratio of the desired current to the ripple current within a predetermined range. Many fuel cell manufacturers have standard limits for ripple currents in systems operating with their fuel cells. In one specific but not limiting embodiment, the step of adjusting the switching frequency may include adjusting the switching frequency of boost converter switching means 26 to maintain a ratio of desired current to ripple current that at least ten to one. Those skilled in the art will appreciate that other measures of ripple current versus desired current might be used. For instance, rather than maintaining a ratio of desired current to ripple current, the method might include maintaining a ratio of ripple current to total current.

In general terms, ripple currents will relate to inductor values of the filter 22 and 24, and the switching frequency of the switching means 26 and 28, independently for each of boost converter 14 and inverter 16. In other words, ripple currents between fuel cell 12 and boost converter 14 will be based at least in part on the switching frequency of switching means 26 and the inductor values of input filter 22. The inductor values of filters 22 and 24 will typically be fixed and, accordingly, adjustment of the switching frequency may be used to reduce ripple currents. With a constant ripple current, as in many earlier designs, the ripple may represent a relatively small proportion of the total current at higher power levels. At relatively lower power levels, however, a constant ripple current would represent a relatively larger proportion of the total current, hence the desirability of reducing the ripple current at lower power levels, as described herein.

One consequence of increasing switching frequency in system 10 may be an increase in power losses, or switching losses, at the respective switching means 26 and 28. Where it is desirable to minimize such power losses, it may therefore be desirable to set the switching frequencies for a given power output at as low a frequency as possible, while still meeting the ripple current requirements. Accordingly, because at higher power levels, the ripple current will typically be relatively small compared to the total current, it may be desirable to use a relatively lower switching frequency. To this end, rather than simply operating at a relatively high switching frequency, the present disclosure contemplates increasing the switching frequency when power output decreases, then decreasing the switching frequency when power output increases.

In many, if not most circumstances it may be desirable to maintain the voltage of DC link 40 at a substantially constant level. In electrical power generation system 10, the DC link voltage ($V_{DC\ Link}$) will relate to the switching frequency of boost converter switching means 26 generally via the equation:

$$V_{DC\ Link}/V_{Fuel\ Cell}=1/1-(ton*fsw);$$

where: ton=on time of semiconductor switch 27;
fsw=switching frequency of boost converter switching means.

The fuel cell power output voltage, $V_{Fuel\ Cell}$, may remain relatively constant. Maintenance of the DC link voltage where switching frequency "fsw" is decreased may therefore be accomplished by increasing the on time, ton, of semiconductor switch 27. Thus, where switching frequency is increased, the on time of semiconductor switch 27 may be decreased, for example, in proportion to the increase in switching frequency. The product of on time and switching frequency is known in the art as the "duty cycle" of the switch. Thus, maintenance of the DC link voltage may be achieved by maintaining the duty cycle of switch 27, even where switching frequency is adjusted. Similar to the adjustment of ton to maintain duty cycle in the boost converter, the pulse-width-modulation or ton may also need to be adjusted in the inverter when changing the inverter switching frequency. What is actually adjusted will depend on the control algorithm being used to control power into the utility.

Adjustment of the switching frequency of inverter switching means 28 may take place in a manner similar to that described with regard to boost converter switching means 26. Adjustment of the switching frequency of inverter switching means 28 may be based on a change in AC current between inverter 16 and utility 18. Various standards are known in the art which relate to the ripple currents, or harmonic currents and total harmonic distortion that may be produced by an electrical power generation system that is coupled with, and either providing power to or receiving power from, a utility, such as an electrical grid.

Similar to the control of ripple currents between fuel cell 12 and boost converter 14, undesired currents between inverter 16 and utility 18 may also be controlled by maintaining a ratio of desired output current, or a fundamental frequency current, to an undesired output current. In particular, harmonic currents may be limited, for example, by maintaining within a predetermined range a ratio of the root mean square of a fundamental frequency current, for example, about 60 Hz, to a root mean square of the total current. Increasing switching frequency of inverter switching means 28 may reduce individual harmonic currents, as well as overall harmonic distortion. With increased switching frequency, other harmonic currents may be generated; however, relatively higher frequency harmonic currents are in many cases less problematic, as they may be easier to filter.

As described, boost converter 14 may be equipped with input filter 22, whereas inverter 16 may be equipped with output filter 30. Each of filters 22 and 30 will typically include reactive components, such as inductors, which may be relatively large and hence costly. For certain relatively high power applications, such filters are often custom made. The size of the respective filters may be selected on the basis of a range of switching frequencies of the respective variable frequency switching means 26 and 28. Thus, the method of the present disclosure may further include the step of conditioning current from electrical power generation system 18 with a filter 22, 30 having a size that is based at least in part on a range of switching frequencies of the respective variable frequency switching means 26, 28, rather than being based on a fixed frequency switching means, as is common in various earlier designs.

Electronic controller 20 may include a microprocessor operable to actively control the switching frequency of one or both of variable frequency switching means 26 and 28 and, thus, electronic controller 20 may be in control communication with each of boost converter 14 and inverter 16. Electronic controller 20 may further include a computer readable medium such as RAM, ROM or some other suitable medium having a switching algorithm recorded thereon. The switching algorithm may include means for adjusting a switching frequency of the respective variable frequency switching means, thereby reducing at least one undesired current oscillation in system 10. The means for adjusting may further include means for adjusting the switching frequency of variable frequency switching means 26, 28, based at least in part on a power output or variable indicative of a power output of electrical power generation system 10. The means for reducing may further include means for increasing the switching frequency of the at least one variable frequency switching means, based on a decrease in power output of system 10, at least when system 10 is in a lower portion of its power output range.

In one contemplated embodiment, switching frequency of the boost converter switching means may be mapped to an input power level from the fuel cell. For instance, electronic controller 20 may adjust the switching frequency of boost converter switching means 26 based on a plurality of stored values of input power level. Electronic controller 20 may continuously or repeatedly sense or otherwise determine an input current to boost converter 14, and may output a control signal to boost converter switching means 26 to control the switching frequency thereof. The stored values for various input power levels may be accessed via look-up tables, neural networks, or any other suitable means. Electronic controller 20 may control switching frequency of the inverter switching means 28 similarly, for instance, via predetermined values for determined output power levels which are mapped relative to predetermined switching frequency values.

While it is contemplated that in one embodiment electronic controller 20 will vary switching frequency across the entire operating range of power inputs and/or power outputs, the present disclosure is not thereby limited. For example, either of boost converter 14 or inverter 16 might be operated with a fixed switching frequency of the respective switching means 26 and 28, when in an upper portion of an output power range. If system 10 enters a lower portion of its power output range, however, active adjustment of the respective switching frequencies could be initiated.

INDUSTRIAL APPLICABILITY

During typical operation of electrical power generation system 10, fuel cell 12 will be continuously supplying electrical power to utility 18 via boost converter 14 and inverter 16. Where power output of fuel cell 12 changes, for example, due to a change in power demand from utility 18, electronic controller 20 may respond by increasing or decreasing the switching frequency of one or both of boost converter switching means 26 and inverter switching means 28. Substantially simultaneous with the change in power output of fuel cell 12, electronic controller 20 may adjust the on time of switch 27 to maintain the DC link voltage. Where an opposite change in power output of fuel cell 10 occurs, electronic controller 20 may respond by oppositely adjusting the switching frequency of one or both of boost converter switching means 26 and inverter switching means 28, as well as the on time of switch 27.

Figure 2:
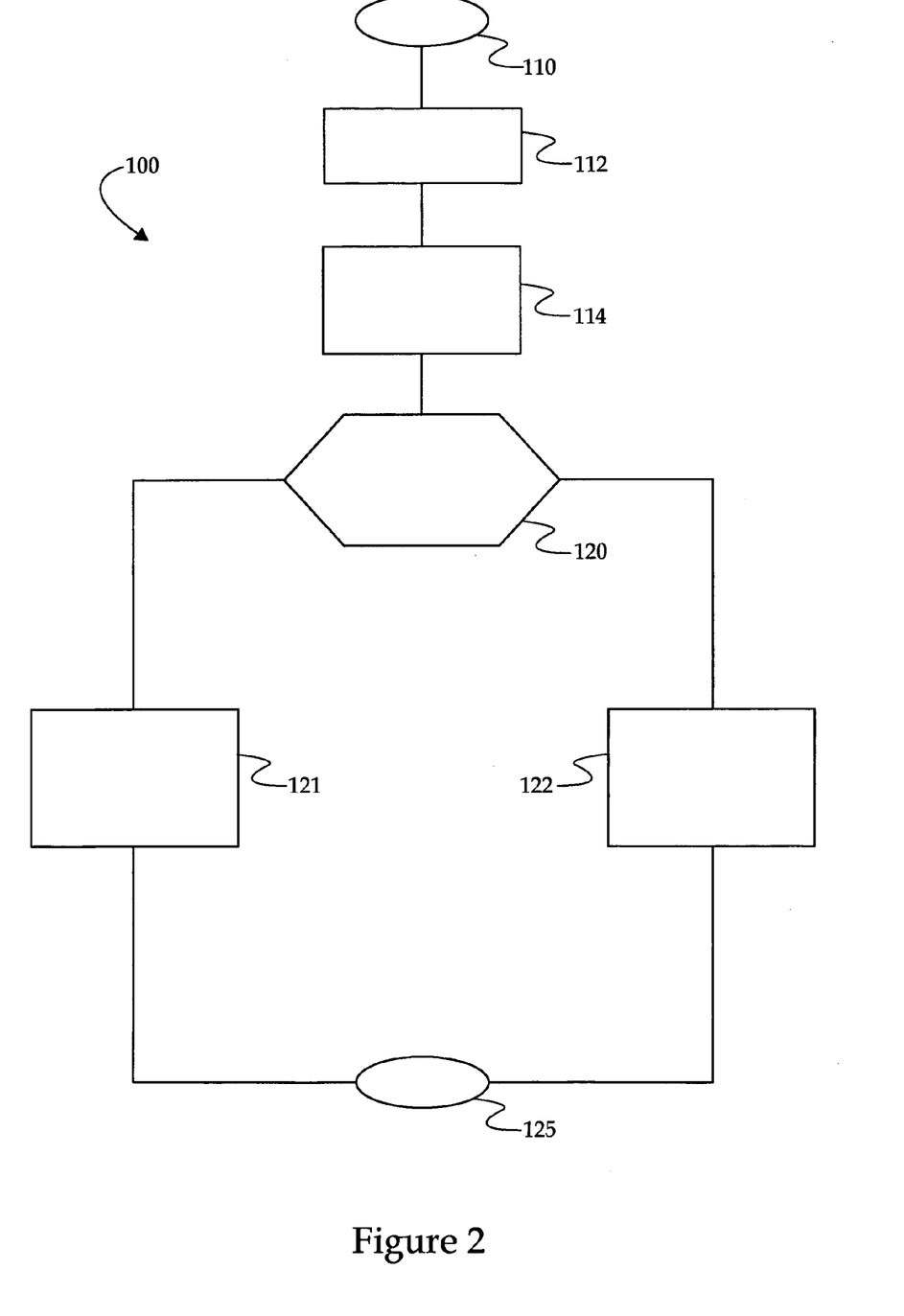
FIG. 2 is a flow chart of a control process according to the present disclosure.

Turning to FIG. 2, there is shown a flowchart 100 of an exemplary control process according to the present disclosure. The process begins at Box 110, a START, from which it proceeds to Box 112. Box 112 represents the delivery of electrical current via at least one variable frequency switching means 26, 28. The process may then proceed to Box 114, wherein a change in power output of system 10 may be determined. The change in power output may be, for example, a change in the power output of a power source, for example, fuel cell 12. Determination of such a change may take place, for example, by monitoring current supplied from fuel cell 12 to boost converter 14. Alternatively, determination of such a change could take place by monitoring an AC output from inverter 16 to utility 18, or an AC input from utility 18 to inverter 16. In other words, the change need not be a change in power generated by system 10, but might alternatively be a change in power absorbed by system 10.

From Box 114, the process may proceed to Box 120 wherein electronic controller 20 may query whether the change in power output is a decrease in power output. If a decrease in power output is detected, the process may proceed to Box 121 wherein electronic controller 20, via the switching algorithm recorded thereon, may increase the switching frequency of the at least one variable frequency switching means 26, 28. Where electronic controller 20 is varying the switching frequency of boost converter switching means 26, for example, it may also maintain the duty cycle of boost converter 14 via adjustment of the on time of semiconductor switch 27 to maintain the DC link voltage.

If a decrease in power output is not detected but, rather, an increase in power output, the process may proceed from Box 120 to Box 122 wherein electronic controller 20, via the switching algorithm recorded thereon, may decrease the switching frequency of the at least one variable frequency switching means 26, 28. Where electronic controller 20 is varying the switching frequency of boost converter switching means 26, for example, it may also increase the on time of semiconductor switch 27 to maintain the DC link voltage. From either of Boxes 121 or 122, the process may proceed to Box 125 to a FINISH.

The present disclosure will allow the use of relatively smaller and less expensive filter components in either of an input filter 22 or an output filter 24. The reactive components, in particular inductors, used in conventional input or output filters tend to be relatively large, heavy and expensive. The filter size is typically based on a given load requirement, switching frequency of the power converter components, and the ripple current requirements. In general terms, such large filter components have traditionally been selected because an inductor of a given size becomes relatively less effective at lower power levels. The fixed switching frequency and fixed inductance of the filters in earlier designs means that the undesired currents typically remain relatively constant across varying power levels. To ensure that adequate filtering will occur across all power levels, relatively larger inductors have typically been used. In accordance with the present disclosure, however, adjusting the switching frequency can reduce the undesired currents. With a relatively smaller undesired current, at lower power levels, the necessary size of filter components is reduced as compared with certain earlier designs.

The present description is for illustrative purposes only, and should not be construed to narrow the scope of the present disclosure. Thus, those skilled in the art will appreciate that various modifications might be made to the presently disclosed embodiments without departing from the intended spirit and scope of the disclosure. For example, while the present disclosure is discussed generally in the context of an electrical power generation system having both of a boost converter and an inverter, it is not thereby limited. Depending upon the particular power source 12 selected, it may be relatively more or less sensitive to undesired ripple currents. Similarly, depending on the configuration and application of the system, limits on the output current harmonics may vary. Thus, in certain systems, only one of a boost converter and an inverter might need to be controlled according to the present disclosure. Still further embodiments are contemplated wherein only one of a boost converter or inverter is used at all. For example, where the utility does not require an AC current, an inverter would be dispensed with. Thus, those skilled in the art will appreciate that the present disclosure may be applicable across a broad spectrum of electrical power generation systems. Other aspects, features and advantages will be apparent upon an examination of the attached drawing Figures and appended claims.

What is claimed is:

1. A method of reducing undesired currents from an electrical power generation system comprising the steps of:
    delivering current via a variable frequency switching means of the electrical power generation system;
    adjusting a switching frequency of the switching means, based at least in part on a power output of the electrical power generation system; and
    wherein the delivering step comprises delivering current from a DC power source.

2. A method of reducing undesired currents from an electrical power generation system comprising the steps of:
    delivering current via a variable frequency switching means of the electrical power generation system;
    adjusting a switching frequency of the switching means, based at least in part on a power output of the electrical power generation system; and
    wherein the delivering step comprises delivering current from a fuel cell.

3. A method of reducing undesired currents from an electrical power generation system comprising the steps of:
    delivering current via a variable frequency switching means of the electrical power generation system;

adjusting a switching frequency of the switching means, based at least in part on a power output of the electrical power generation system; and
wherein the adjusting step comprises increasing a switching frequency of the switching means, if the power output decreases when the electrical power generation system is in a lower portion of a power output range.

4. The method of claim 3 wherein:
the delivered current comprises a desired current and a ripple current; and
the adjusting step further comprises the step of maintaining a ratio of the desired current to the ripple current within a predetermined range.

5. The method of claim 4 wherein the adjusting step comprises increasing the switching frequency of a boost converter switching means based on a decrease in an output current from the fuel cell.

6. The method of claim 5 wherein:
the maintaining step comprises maintaining a ratio of the desired current to the ripple current that is at least ten to one; and
the delivering step further comprises the step of supplying a substantially constant DC link voltage from the boost converter by decreasing an on time of the boost converter switching means in proportion to an increase in the switching frequency thereof.

7. The method of claim 4 wherein the adjusting step comprises increasing the switching frequency of an inverter switching means based on a decrease in an AC current from an inverter.

8. The method of claim 7 wherein the maintaining step comprises maintaining, within a predetermined range, a ratio of the root mean square of a fundamental frequency current from the inverter to a total output current from the inverter.

9. The method of claim 3 further comprising the step of conditioning current from the electrical power generation system with a filter having a size that is based at least in part on a range of switching frequencies of the variable frequency switching means.

10. An electrical power generation system comprising:
at least one variable frequency switching means;
an electronic controller in control communication with said at least one variable frequency switching means, said electronic controller including a switching algorithm having means for adjusting a switching frequency of said at least one variable frequency switching means based at least in part on a power output of said electrical power generation system; and
a DC power source coupled with said at least one variable frequency switching means.

11. An electrical power generation system comprising:
at least one variable frequency switching means;
an electronic controller in control communication with said at least one variable frequency switching means, said electronic controller including a switching algorithm having means for adjusting a switching frequency of said at least one variable frequency switching means based at least in part on a power output of said electrical power generation system; and
a power source that includes a fuel cell.

12. An electrical power generation system comprising:
at least one variable frequency switching means;
an electronic controller in control communication with said at least one variable frequency switching means, said electronic controller including a switching algorithm having means for adjusting a switching frequency of said at least one variable frequency switching means based at least in part on a power output of said electrical power generation system; and
said means for adjusting further includes means for increasing said switching frequency based on a decrease in power output of the electrical power generation system, when said electrical power generation system is in a lower portion of a power output range.

13. An electrical power generation system comprising:
at least one variable frequency switching means;
an electronic controller in control communication with said at least one variable frequency switching means, said electronic controller including a switching algorithm having means for adjusting a switching frequency of said at least one variable frequency switching means based at least in part on a power output of said electrical power generation system; and
wherein said electrical power generation system includes at least one of, a boost converter and an inverter.

14. The electrical power generation system of claim 13 further comprising:
a boost converter coupled with said fuel cell and with a DC link, said boost converter including a boost converter switching means in control communication with said electronic controller;
wherein said switching algorithm includes, means for increasing the switching frequency of said boost converter switching means based in part on a predetermined ripple current limit of said fuel cell.

15. The electrical power generation system of claim 13 comprising:
an inverter coupled with said fuel cell, said inverter including at least one inverter switching means in control communication with said electronic controller;
wherein said switching algorithm includes, means for increasing the switching frequency of said variable frequency switching means based in part on a predetermined output harmonic current limit.

16. An electronic controller for an electrical power generation system that includes a source of electrical power and at least one variable frequency switching means coupled therewith, said electronic controller comprising:
a microprocessor having a computer readable medium with a switching algorithm recorded thereon, said switching algorithm including means for reducing at least one undesired current oscillation in the electrical power generation system, said means for reducing including means for adjusting a switching frequency of the switching means based at least in part on a variable indicative of a power output of the electrical power generation system.

17. The electronic controller of claim 16 wherein said means for reducing includes means for increasing the switching frequency of the at least one variable frequency switching means based at least in part on a decrease in power output of the electrical power generation system, when said electrical power generation system is in a lower portion of a power output range.

18. The electronic controller of claim 17 wherein said means for increasing includes means for increasing said frequency based at least in part on a decrease in electrical current to or from a power converter of the electrical power generation system.

19. The method of claim 6 wherein the delivering step comprises delivering current from a DC power source.

20. The method of claim 19 wherein the delivering step comprises delivering current from a fuel cell.

21. The method of claim 8 wherein the delivering step comprises delivering current from a DC power source.

22. The method of claim 21 wherein the delivering step comprises delivering current from a fuel cell.

23. The method of claim 9 wherein the delivering step comprises delivering current from a DC power source.

24. The method of claim 23 wherein the delivering step comprises delivering current from a fuel cell.

25. The system of claim 12 including a DC power source coupled with said at least one variable frequency switching means.

26. The system of claim 25 wherein the DC power source includes a fuel cell.

* * * * *

UNITED STATES PATENT AND TRADEMARK OFFICE
CERTIFICATE OF CORRECTION

PATENT NO. : 7,239,113 B2  Page 1 of 1
APPLICATION NO. : 11/121245
DATED : July 31, 2007
INVENTOR(S) : James P. Johnson It is certified that error appears in the above-identified patent and that said Letters Patent is hereby corrected as shown below:

On the first page of the specification, STATEMENT OF GOVERNMENT INTEREST, column 1, line 9, please change government contract number DE-FC36-01G011095 to DE-FC04-02AL67623.

Signed and Sealed this

First Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 7,239,113 B2  Page 1 of 1
APPLICATION NO. : 11/121245
DATED : July 3, 2007
INVENTOR(S) : James P. Johnson It is certified that error appears in the above-identified patent and that said Letters Patent is hereby corrected as shown below:

On the first page of the specification, STATEMENT OF GOVERNMENT INTEREST, column 1, line 9, please change government contract number DE-FC36-01G011095 to DE-FC04-02AL67623.

This certificate supersedes the Certificate of Correction issued January 1, 2008.

Signed and Sealed this

Twenty-ninth Day of January, 2008

JON W. DUDAS
*Director of the United States Patent and Trademark Office*